United States Patent [19]

Gartner

[11] Patent Number: 5,171,783

[45] Date of Patent: * Dec. 15, 1992

[54] PROCESS FOR THE PRODUCTION OF HIGH MOLECULAR WEIGHT COPOLYMERS OF DIALLYLAMMONIUM MONOMERS AND ACRYLAMIDE MONOMERS IN AN AQUEOUS DISPERSED PHASE

[75] Inventor: Herbert A. Gartner, Baden-Baden, Fed. Rep. of Germany

[73] Assignee: The Dow Chemical Company, Midland, Mich.

[*] Notice: The portion of the term of this patent subsequent to Feb. 25, 2009 has been disclaimed.

[21] Appl. No.: 667,708

[22] Filed: Mar. 11, 1991

[51] Int. Cl.$^5$ .................... C08L 47/00; C08L 33/24
[52] U.S. Cl. .................... 524/801; 524/815; 524/812; 524/555; 526/307.3; 526/84; 526/87

[58] Field of Search .............. 526/307.3, 84, 87; 524/801, 812, 815, 555; 528/487

[56] References Cited

U.S. PATENT DOCUMENTS

| | | | |
|---|---|---|---|
| 4,617,362 | 10/1986 | Becker | 526/209 |
| 4,628,071 | 12/1986 | Morgan | 524/832 |
| 4,772,659 | 9/1988 | Chan | 524/728 |
| 4,925,884 | 5/1990 | Hübner | 523/340 |

*Primary Examiner*—Joseph L. Schofer
*Assistant Examiner*—M. Nagumo

[57] ABSTRACT

Water-soluble, high molecular weight, linear copolymers of a diallyl ammonium monomer and an acrylamide monomer are prepared by emulsion copolymerization of a major portion of the acrylamide monomer via stage-addition, and the addition of a chain transfer agent at the conclusion of said copolymerization to prevent branching and cross-linking.

15 Claims, No Drawings

PROCESS FOR THE PRODUCTION OF HIGH MOLECULAR WEIGHT COPOLYMERS OF DIALLYLAMMONIUM MONOMERS AND ACRYLAMIDE MONOMERS IN AN AQUEOUS DISPERSED PHASE

This invention relates to high molecular weight, water soluble, linear copolymers of diallyl ammonium monomers and acrylamide monomers of varying cationicities, and to methods of preparing the same. Copolymers of this type are useful as cationic flocculants in the treatment of industrial water, as sludge conditioners for the treatment of municipal water systems, and as drainage and retention aids in the manufacture of paper.

Diallyl ammonium monomers, e.g. diallyl dimethyl ammonium chloride (DADMAC), are quaternary monomers, which when polymerized, yield water soluble polymers that are cationic in nature. The polymerization of acrylamide monomers, on the other hand, produces water soluble polymers that are essentially nonionic in nature. Thus, the copolymerization of diallyl ammonium monomers and acrylamide monomers results in the formation of water soluble copolymers having various degrees of cationicity, depending upon the amount of diallyl ammonium monomer that is incorporated into the final copolymer.

The copolymerization of diallyl ammonium monomers and acrylamide monomers in solution is well known. U.S. Pat. No. 2,923,701, for example, describes the simultaneous copolymerization of acrylamide and diallyl ammonium monomers in solution by the addition of a redox catalyst, such as ammonium persulfate and potassium metabisulfite, to an aqueous mixture of the monomers.

Copolymers of diallyl ammonium monomers and acrylamide monomers can also be obtained utilizing emulsion polymerization techniques in accordance with the teachings of U.S. Pat. No. 3,920,599. Stable water-in-oil copolymer emulsions are prepared, which can then be inverted by means of suitable hydrophilic, water-soluble surfactants to form water soluble solutions that are used as such. U.S. Pat. No. 4,070,930 discloses the preparation of stable emulsion copolymers of diallyl ammonium monomers and acrylamide monomers, which can be inverted by the addition of water.

An improved process for the incorporation of diallyl ammonium monomers into an acrylamide polymer by means of either emulsion or solution polymerization techniques is disclosed in European Patent Application 0 188 721. This improvement comprises the step of polymerizing diallyl ammonium monomers and acrylamide monomers in the presence of a copolymerizable monomer, such as a quaternary substituted acrylamide or methacrylamide. The monomer utilized with the acrylamide monomers must have a greater reactivity than the diallyl ammonium monomers.

European Patent Application 0 247 774 discloses cationic copolymers having improved performance characteristics which are prepared from a premix containing the nonionic monomer and a portion of the cationic monomer. The premix is emulsified, the remaining cationic monomer added, and the entire reaction mixture is copolymerized.

U.S. Pat. No. 4,152,200 discloses the preparation of a cationic copolymer having improved drainage characteristics in the preparation of formed paper. This copolymer is prepared by means of a water-in-oil emulsion process comprising the incremental addition of a cationic monomer to the nonionic monomer during the course of the polymerization. This reference expressly teaches the addition of cationic monomers to solutions of nonionic monomers. In contradistinction thereto, the present invention discloses and claims the preparation of different copolymers by means of the continuous addition of a nonionic monomer to a cationic monomer during the course of polymerization.

The present invention relates to a process for the preparation of high molecular weight, water-soluble, linear copolymers of diallyl ammonium monomers and acrylamide monomers having a uniform diallyl ammonium monomer to acrylamide monomer ratio. More particularly this process comprises the steps of:

a) preparing a water-in-oil monomer emulsion by mixing an oil phase containing an oil soluble emulsifing agent, with an aqueous phase comprising a mixture of a diallyl ammonium monomer, a portion of the total amount required of an acrylamide monomer, a polymerization initiator, and a water dispersable emulsifying agent;

b) initiating the copolymerization of said monomer emulsion by increasing the temperature of the emulsion, preferably to a temperature ranging from about 30° C. to about 40° C.;

c) adding the remaining acrylamide monomer to the monomer emulsion via continuous stage addition, preferably over a period of from about 0.5 to about 8 hours at a temperature ranging from about 20° to about 50° C. to form a copolymer emulsion;

d) homogeneously mixing a chain transfer agent into said copolymer emulsion to form a copolymer emulsion mixture; and e) heating said copolymer emulsion mixture to reduce the residual monomer present, preferably at a temperature ranging from about 60° to about 90° C. for a period of time ranging from about 0.1 to about 4.0 hours.

This invention also relates to high molecular weight water soluble linear copolymers of diallyl ammonium monomers and acrylamide monomers prepared in accordance with the process of this invention. Such copolymers are particularly useful as flocculants for sludge conditioning in the treatment of municipal and industrial water and waste water systems over a wide range of pH. The copolymers described herein are also useful as drainage and retention aids in the manufacture of paper.

As previously indicated, the preparation of diallyl ammonium monomer and acrylamide monomer based copolymers is well known. In general, however, the existing prior art copolymers are non-uniform in their composition and tend to be highly branched and cross-linked. In addition, the prior art copolymers are of relatively low molecular weight, having intrinsic viscosities generally less than 6 dl/g.

The present invention overcomes these deficiencies of the prior art and enables the preparation of high molecular weight copolymers of diallyl ammonium monomers and acrylamide monomers via an emulsion process having intrinsic viscosities ranging from 10 to 25 dl/g. Preferably, diallyl ammonium monomer and acrylamide monomer based copolymers are prepared which have intrinsic viscosities ranging from 15 to 20 dl/g. It is generally recognized by those skilled in the art that the intrinsic viscosity is an indication of polymer molecular weight. Thus, in general, the higher the intrinsic viscosity, the greater is the molecular weight of the particular polymer or copolymer prepared.

When prepared in accordance with the teachings of this invention, copolymers of varying cationicities can be prepared, thereby enabling the preparation of copolymers that can be tailored to their use. Furthermore, such copolymers are uniform in composition. That is to say, copolymers are prepared which contain little, if any, residual monomer, and which have a uniform diallyl ammonium monomer to acrylamide monomer unit ratio throughout the entire length of the copolymer chain.

One difficulty in the preparation of diallyl ammonium monomer and acrylamide monomer based copolymers, that have a uniform distribution throughout the length of the copolymer chain, is due to the difference in reactivity of the acrylamide monomers as compared to the diallyl ammonium monomers. This difference in reactivity results in a non-uniform distribution of the diallyl ammonium monomer throughout the copolymer chain. Thus, at the onset of the copolymerization reaction, a relatively larger number of acrylamide monomer units are initially incorporated into the polymer chain due to the greater reactivity of the acrylamide monomers. Accordingly, at the conclusion of the copolymerization reaction, relatively more of the diallyl ammonium monomer units remain unused and remain either as free monomer, or form low molecular weight homopolymers.

These excess diallyl ammonium monomers, or low molecular weight diallyl ammonium based homopolymers, remain either as a residual mixture or they become incorporated into the copolymer chain, which results in a non-uniform distribution of the monomer units throughout the copolymer chain. This is particularly true in the case of copolymers in which the final diallyl ammonium content is greater than 20% on a molar basis of the total copolymer content.

Another difficulty in the preparation of high molecular weight linear copolymers of diallyl ammonium monomers and acrylamide monomers is due to the manner in which the diallyl ammonium monomers polymerize. Normally, the diallyl ammonium monomers polymerize by incorporating both of the allyl bonds within the same molecule to form a linear polymer chain. A small proportion of the monomers, however, can polymerize via the incorporation of only one of its allyl bonds, thereby leaving a pendant double bond remaining in the molecule. These pendant double bonds can subsequently initiate branching, particularly at higher temperatures, to produce cross-linked polymers that have a reduced solubility in water, see Jaeger et al., *Journal of Macromolecular Science*, Part A Chemistry, 593–614, (1984).

This greater reactivity of the acrylamide monomers, in combination with the tendency of the diallyl ammonium monomers to polymerize via branching or cross-linking, results in the formation of non-linear diallyl ammonium monomer and acrylamide monomer based copolymers having relatively low intrinsic viscosities. Such copolymers are not particularly well suited as flocculants in water and waste water systems for sludge conditioning, or as drainage and retention aids in the manufacture of paper. These problems have now been overcome by means of the present invention, which enables the preparation of high molecular weight, linear copolymers of diallyl ammonium monomers and acrylamide monomers of uniform composition having little, if any, branching and cross-linking in the polymer chain.

The diallyl quaternary ammonium compounds preferably correspond to the formula

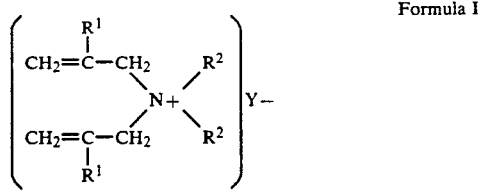

Formula I wherein
$R^1$ is independently in each occurrence hydrogen or $C_{1-4}$ alkyl; $R^2$ is independently in each occurrence hydrogen, $C_{1-18}$ alkyl, $C_{1-18}$ alkoxyalkyl or $C_{1-18}$ hydroxyalkyl moieties; and Y is an anion, which does not significantly interfere in the polymerization reaction.

Illustrative examples of radicals represented by $R^2$ are methyl to octadecyl, inclusive; hydroxymethyl and hydroxyethyl to hydroxyoctadecyl, inclusive; and methoxymethyl and the various high alkoxy (e.g., methoxy to octadecoxy, inclusive) alkyls, e.g., ethyl to octadecyl inclusive. Illustrative examples of anions represented by Y are the halide ions (that is, Y can represent halogen, more particularly chlorine, bromine, fluorine or iodine), sulfate, sulfonate, phosphate, hydroxide, borate, carbonate, thiosulfate, isocyanate, acetate and the other common inorganic and organic ions. Specific examples of compounds embraced by formula hereinbefore are the diallyl, dimethallyl, diallyl dimethyl and diethallyl dimethyl, di (beta-hydroxyethyl) and di(beta-ethoxyethyl) ammonium chlorides, bromides, phosphates and sulfates. Other examples will be apparent to those skilled in the art from the formula and from the numerous examples of anions represented by Y and of radicals represented by $R^1$ and $R^2$ that have been given hereinbefore with reference to the formula.

$R^1$ is preferably hydrogen, methyl, or ethyl; even more preferably hydrogen or methyl; and most preferably hydrogen. $R^2$ is preferably hydrogen or $C_{1-18}$ alkyl; more preferably hydrogen or $C_{1-4}$ alkyl, and most preferably hydrogen or methyl. Y is preferably a halide ion, and most preferably a chloride ion. In a most preferred embodiment the diallyl ammonium compound is a diallyl dimethyl ammonium compound; the most preferred diallyl dimethyl ammonium compound is diallyl dimethyl ammonium chloride (DADMAC).

Acrylamide compounds as used herein refers to acrylamide, methacrylamide, and derivatives thereof wherein the alpha carbon may be substituted with a $C_{1-5}$ lower alkyl moiety and the amide nitrogen may be substituted with a $C_{1-18}$ alkyl moiety, $C_{1-18}$ alkyloxy moiety or $C_{1-18}$ hydroxyalkyl moiety. Such acrylamide compounds preferably correspond to the formula

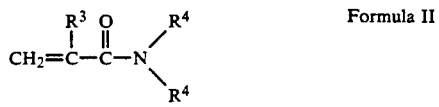

Formula II wherein
$R^3$ is independently in each occurrence hydrogen or a $C_{1-5}$ lower alkyl moiety;

$R^4$ is independently in each occurrence hydrogen, $C_{1-18}$ alkyl, $C_{1-18}$ alkoxy, or $C_{1-18}$ hydroxy substituted alkyl. $R^3$ is preferably hydrogen or methyl, and most preferably hydrogen. $R^4$ is preferably hydrogen or $C_{1-18}$ alkyl. $R^4$ is more preferably hydrogen or $C_{1-8}$ alkyl. $R^4$ is most preferably hydrogen or $C_{1-4}$ alkyl.

In general, the process of this invention utilizes a controlled addition or stage-addition of the acrylamide monomer during the emulsion copolymerization reaction. Surprisingly, it has been discovered that the continuous stage-addition of the acrylamide monomer produces high molecular weight copolymers of diallyl ammonium monomers and acrylamide monomers which, heretofor have not, as yet, been available. Copolymers having high diallyl ammonium monomer conversions can be prepared that contain a uniform distribution of diallyl ammonium and acrylamide monomer units throughout the entire length of the copolymer chain with little, if any, residual diallyl ammonium monomer or acrylamide monomer remaining in the finished product. The process of this invention also utilizes the addition of a chain transfer agent to prevent branching and cross-linking of the polymer chain from occurring, particularly at elevated temperatures.

The impurities in the starting monomers can affect the overall properties of the final polymer. The starting monomers should be sufficiently pure to prepare linear copolymers with relatively constant diallyl ammonium monomer to acrylamide monomer ratios along the chain and which has an intrinsic of from about 10 to about 25 d/l. In a preferred embodiment, wherein DADMAC is the diallyl ammonium monomer and the acrylamide monomer is acrylamide, DADMAC has no more than about 50 ppm of allyldimethylamine; about 100 ppm of dimethylamine, and about 10 ppm of allyl alcohol. Preferably, the acrylamide has no more than 1200 ppm of nitrilotrispropionamide, and 10 ppm of methoxyhydroquinone.

To initiate copolymerization, a water-in-oil emulsion is prepared which contains the diallyl ammonium monomer and a portion of the acrylamide monomer to be employed. The oil phase of the emulsion can be any water insoluble, aliphatic or aromatic liquid organic substance. Organic liquids such as benzene, xylene, toluene, mineral oils, mineral spirits, kerosene, naphthas and perolatums can be employed. In general, the oil phase comprises from about 20 to about 50 volume percent of the total emulsion composition. Preferably, the oil phase comprises from about 25 to about 30 volume percent of the emulsion composition. A particularly useful oil from the standpoint of its physical and chemical properties is the branched-chain isoparaffin solvent sold under the name "Isopar M". Typical specifications of this narrow-cut isoparaffinic solvent are set forth as shown below:

| | |
|---|---|
| Density at 12° C. | 0.786 g/l |
| Color (Saybolt) | 30 |
| Refractive Index, $n_D^{20}$ | 1.436 |
| Viscosity (25° C.) | 2.46 mPa · s (cp) |
| Boiling Point Characteristics (°C.) | |
| Start | 204 |
| 5% | 212 |
| 10% | 215 |
| 50% | 224 |
| 90% | 236 |
| 95% | 242 |
| Dryness | 247 |

| -continued | |
|---|---|
| Residue (mg/100 ml) | <1 |
| Aromatic Content (%) | 0.3 |
| Sulfur Content ppm | <1 |
| Flash Point °C. | 75 |

The oil phase also contains a primary emulsifier which serves to stabilize the emulsion during polymerization. The primary emulsifying agent can be selected from any of a large group of surfactants that are oil soluble and that have an HLB value in the range of from about 2 to about 10, preferably less than about 7. Suitable primary emulsifiers include the sorbitan esters, phthalic esters, the reaction product of oleic acid with isopropanolamide, fatty acid glycerides, glycerine esters as well as ethoxylated derivates thereof. These primary emulsifiers can be used alone or in combination. As such all of the primary emulsifiers should not be used in amounts greater than about 5% by weight of the total emulsion. Preferably, the amount should range from about 1.0 to about 2.0% by weight of the total emulsion. The preferred primary emulsifying agent for the oil phase is oleic mono-isopropanol amide.

The dispersed phase is the aqueous phase which essentially comprises an aqueous solution of the diallyl ammonium monomer and an initial portion of the total amount of the acrylamide monomer to be employed. A polymerization initiator or polymerization initiator package together with a water dispersible emulsifying agent can be conveniently added at this point to the aqueous phase. The dispersed aqueous phase comprises in general, from about 50 to about 80 volume percent of the total emulsion composition. Preferably, the dispersed phase comprises 70 to 75 volume percent of the emulsion. However, in order to prepare emulsions having a high polymer content, the dispersed aqueous phase can comprise as much as 75 to 80 volume percent of the emulsion composition.

A second emulsifying agent, added to the aqueous phase, has been found to be particularly advantageous in stabilizing the water-in-oil emulsion during the copolymerization reaction. Any conventional oil soluble, water dispersible surfactant having an HLB ranging from 2 to 8 can be employed as an emulsifying agent for the aqueous phase. Examples of suitable surfactants include sorbitan monooleate, the reaction products of oleic acid with ispropanolamide, sorbitan stearate, decyl sodium phthalate, hexadecyl sodium phthalate, and glyceride mono and diesters of lauric and stearic acids. Sorbitan monooleate dispersed in the aqueous phase is the preferred secondary emulsifying agent.

The amount of diallyl ammonium monomer to be employed is dependent upon the desired cationicity of the final copolymer. An important advantage of this invention is that copolymers of varying cationicities can be precisely prepared in accordance with the teachings of this invention. The greater the number of diallyl ammonium units that are introduced into the polymer chain, the greater will be the cationicity of the resulting copolymer. Thus, copolymers useful as cationic flocculants in water clarification systems or as sewage dewatering agents, require copolymers having a higher degree of cationicity than cationic flocculants useful as drainage and/or retention aids in the manufacture of paper.

The copolymers contemplated by the present invention cover a wide range of cationicities, e.g. from about 5 to about 95 mole % cationicity. That is to say, in a copolymer consisting of 100 monomer units, the copolymers described comprise from about 5 to about 95 diallyl ammonium units, and conversely from about 95 to about 5 acrylamide monomer units. Preferably, copolymers comprising from about 5 to about 75 mole % cationicity can be prepared. Still more preferably, polymers having from about 10 to about 50 mole % cationicity can be prepared in accordance with the teachings of this invention.

The copolymerization reaction is generally initiated using free radical polymerization techniques known to those skilled in the art. Compounds which form mainly water soluble radicals are suitable as polymerization initiators. Such compounds are conveniently dissolved in the aqueous phase. For example, azostarters such as 2,2-azobis-(N,N'-dimethylene-isobutyramidine) dihydrochloride, 2,2'-azobis-(2-amidinopropane) dihydrochloride, 2,2'-azobis(N,N'-dimethyleneisobutyramidine), 4,4'-azobis-(4-cyanopentane-carboxylic acid), 2,2'-azobis(4-methoxy-2,4-dimethylvalero-nitrile), 2,2'-azobis(2,4-dimethylvaleronitrile), (1-Phenylethyl)azodiphenylmethane, 2,2'-azobisisobutyro-nitrile, dimethyl 2,2'-azobisisobutyrate, and 2,2'-azobis-(2-methylbutyronitrile) can be employed.

Peroxide polymerization initiators can also be employed, as for example, dibenzoyl peroxide, dilauryl peroxide, di-2-ethylhexylperoxydicarbonate, dicyclohexylperoxydicarbonate, bis-(4-tert. butylcyclohexyl) peroxydicarbonate, tert. butylperpivalate, tert. butyl-perbenzoate, tert. butylpermaleinate, di-tert. butyl-peroxide, tert.-hydroperoxide, hydrogen peroxide, ammonium persulfate, potassium persulfate, sodium persulfate, and redox catalysts in combination with reducing agents such as (II)-ammonium sulfate, ascorbic acid, sodium methyl sulfinate, disodium disulfite and sodium hydrogen sulfite can be employed. These initiators can be used alone or in combination with one another.

The rate of decomposition of the more readily decomposed peroxides can be reduced by the addition of organic metal complex compounds, as for example, copper acetyl acetonate. Thus the rate of peroxide decomposition can be adapted, for example, to the particular polymerization temperature selected. Preferred redox catalysts are those selected from one or several peroxides in combination with a reducing agent. Especially preferred are persulfates or peresters or mixtures of persulfates and peresters as a component of the redox polymerization initiators. The polymerization initiators are used in amounts ranging from 0.001 to 5% by weight, and preferably from about 0.02 to 2% by weight, relating to the amount of monomers employed.

Sufficient water should be employed in the aqueous phase to facilitate emulsion formation and to homogeneously dissolve all of the components present in the aqueous phase. As starter solutions, aqueous monomer solutions containing from about 40 to about 70% of monomer can advantageously be employed. Preferably, aqueous monomer solutions containing from about 50 to about 60% monomer are employed. If necessary, additional water can be added during the course of the copolymerization reaction to the copolymer emulsion in order to provide optimum conditions for the reaction to proceed. It is immaterial whether the oil phase is added to the aqueous phase or vice versa. The two phases are slowly added together with vigorous stirring preferably at about 5,000 to about 20,000 rpm. The resulting emulsion is deoxygenated with nitrogen and the temperature of the emulsion mixture is slowly increased to initiate copolymerization. The preferred temperature at which polymerization occurs ranges from about 20° to about 50° C. More preferably, polymerization is conducted at a temperature ranging from about 30° to about 40° C. Still more preferably, a temperature of about 35° C. is optimally employed.

During the course of the polymerization reaction, the acrylamide monomer is continuously added to the diallyl ammonium monomer via a process of stage addition. That is to say, an initial amount of the acrylamide monomer is present in the aqueous emulsion phase at the outset of the copolymerization reaction. As the reaction proceeds, fresh acrylamide monomer is continuously added to the copolymerization mixture at a predetermined rate. In general, about 12 to about 20% of the total amount of the acrylamide monomer is added at the outset to the reaction mixture. More preferably, from about 15 to about 17% of the total amount of the acrylamide monomer required is added to initiate copolymerization. The copolymerization reaction of diallyl ammonium monomer and acrylamide monomer is an exothermic reaction. Thus, once copolymerization begins, the temperature of the reaction mixture rapidly increases. At this point the remaining amount of acrylamide monomer is introduced to the reaction mixture via a process of stage-addition with the polymerization temperature being maintained preferably at about 20° to about 50° C., more preferably at about 30° to about 40° C., and most preferably at about 35° C.

As indicated, as soon as the initial copolymerization has begun, the remaining acrylamide monomer solution is stage-added. The period of time during which stage addition takes place is dependent upon the amount of diallyl ammonium monomer units that are to be introduced into the polymer chain. Thus a copolymer having a 10 mole % cationicity preferably undergoes stage addition for about one hour, whereas a copolymer having 30 mole % cationicity preferably undergoes stage addition for about 3 hours. Copolymers having up to 90 mole % cationicity preferably undergo stage addition for about 8 hours. These periods of time will, of course, vary slightly depending upon the type and design of reactor employed, the degree of mixing and the temperature at which the copolymerization is conducted. For large scale preparations, the particular parameters to be employed can be optimized via standard procedures known to those skilled in the art.

Preferably, the stage-added acrylamide monomer solution is separately deoxygenated, and continuously introduced in such a manner that a slightly decreasing feed rate is achieved throughout the total period of stage addition. Thus, for example, during the first quarter of the period for stage addition, about 30 to about 35% of the acrylamide monomer solution is stage-added; during the second quarter of the stage addition period, about 25 to about 30% of the acrylamide monomer solution is stage-added; during the third quarter about 20 to about 25% of the monomer solution is stage-added; and the last about 15 to about 20% of the acrylamide monomer solution is introduced during the final quarter of the stage addition period. For the production of large quantities of copolymers, a metering pump can be advantageously employed.

Copolymers of diallyl ammonium and acrylamide monomers prepared at a temperature of about 35° C. are completely soluble in water, irrespective of how large their molecular weights may be. Copolymers prepared at temperatures about about 40° C. tend to be insoluble or only partially insoluble in water. This insolubility is presumed to be the result of the increased tendency for the diallyl ammonium monomer to polymerize via branching and cross-linking at higher temperatures. The more branched and cross-linked the copolymers become, the less soluble they are in water. Indeed, one of the qualitative tests for the degree of branching and cross-linking for this type of copolymer is its solubility in water.

Inasmuch as the polymerization reaction is exothermic in nature, control of the reaction temperature is critical. In order to maintain close control over the reaction temperature, the boiling point of an azotrope formed by the reaction mixture can be employed. Thus, where the branched chain isoparaffin solvent sold under the name "Isopar M" is employed, the condensate of the vapor above the emulsion phase consists of about 12% by volume of solvent and 88% by volume of water. If the polymerization reaction is conducted at a reduced pressure of from 50 to 55 millibars, a constant temperature of 35°±1.0° C. is obtained.

It is advantageous to keep the emulsion mixture well mixed and in intimate contact with the stage-added acrylamide monomer throughout the entire stage-addition process, so as to obtain a homogeneous distribution of diallyl ammonium monomer throughout the copolymer chain. Insufficient mixing results in non-homogeneous polymerization, whereas too rapid or too intensive mixing results in polymer degradation. The degree and amount of mixing required to obtain a homogeneous distribution of diallyl ammonium monomer throughout the copolymer chain varies widely depending upon the size and the shape of the particular apparatus employed. Reaction mixers used in the preparation of thick emulsions or other similar materials, that provide intimate mixing via a shearing action, are particularly well adapted to this process.

As soon as all of the acrylamide monomer has been stage-added to the emulsion mixture and permitted to react, a chain transfer agent is added. The addition of a chain transfer agent at the conclusion of the copolymerization process is an essential step in the present invention for the preparation of high molecular weight linear copolymers. Normally, chain transfer agents are introduced at the beginning of a polymerization process. However, in accordance with the process of the invention, the chain transfer agent is added at the conclusion of the copolymerization process so as to prevent any branching or cross-linking of formed copolymer chains from occurring. Preferably chain transfer agents include, for example, lower alkyl alcohols having from 1 to 5 carbon atoms, mercaptoethanol, mercaptopropanol, thioglycolic acid, dodecylmercaptan, formic acid, halogenated hydrocarbons, such as bromoethane or carbon tetrachloride, and sodium hypophosphite. Preferably, a solution of sodium hypophosphite is employed. The chain transfer agents as used herein are preferably utilized in amounts ranging from about 0.1 to about 3% by weight with respect to the monomers employed. Upon addition, they are preferably thoroughly mixed into the emulsion mixture.

Following the addition of the chain transfer agent, the emulsion mixture is heated for a period of time and at a temperature which serves to minimize the residual monomer content of the copolymer produced. Preferably, the emulsion mixture is heated to from about 60° to about 90° C., and more preferably about 75° C. and maintained at that temperature for a period of from about 0.1 to about 4.0 hours. This is especially important for environmental reasons with respect to any residual acrylamide monomer that may be present. Thus, in addition to enhancing the uniformity of the copolymers so prepared, the copolymers prepared are non-hazardous and are environmentally compatible. Preferably, less than about 100 ppm of acrylamide monomer is present in the final product.

The copolymer emulsion mixture containing the desired product is cooled and, if desired, the copolymer can be isolated as such. For example, the cooled emulsion can be poured into an excess of acetone, filtered and dried to form a fine white powder. Alternatively, the emulsion can be vacuum distilled to remove the solvents, or spray dried. The dried product so obtained is a white, granular, pourable powder, which is completely soluble in water, and which has preferably an intrinsic viscosity ranging from about 10 to about 25 dl/g, as determined by viscosity measurements conducted in a 4% sodium chloride solution.

Alternatively, the copolymerized emulsion can be inverted to an oil-in-water emulsion for use in aqueous stock solutions. In order to make the copolymer emulsion self-inverting upon the addition of water, a sufficient amount of a suitable breaker surfactant must be employed. The particular breaker surfactant that will perform optimally with a given emulsion system can be readily determined by methods known to those skilled in the art. Typical breaker surfactants are those having high HLB numbers greater than 10, such as ethoxylated octyl and nonyl phenols, ethoxylated nonyl phenol formaldehyde resins, polyethylene oxide esters of fatty acids, dioctyl esters of sodium sulfosuccinate, polyethoxylated alcohols and others. Suitable mixtures and combinations of breaker surfactants can also be employed. The nature of the breaker surfactant employed must be such as to provide a stable emulsion mixture upon addition to water. Preferably, a polyethoxylated aliphatic secondary alcohol having nine ethylene oxide units and a hydrophobic chain of 12–14 carbon atoms can be employed as a breaker surfactant for the copolymer emulsion systems described herein.

Preferably, the breaker surfactant is added in an amount from about 0.5 to about 10% by weight, based upon the total emulsion. More preferably from about 2 to about 5% of breaker surfactant, and still more preferably from about 3 to about 4% by weight of emulsion is employed. Upon addition to water the water-in-oil emulsion containing the breaker surfactant inverts and is converted to an oil-in-water emulsion.

Once prepared, the emulsions of the present invention can be chemically modified in any manner known to the art. The term "chemically modified" is intended to cover any further treatment of the dispersed water soluble copolymer emulsions, including the addition of components without which the normally water-soluble polymeric particles would coagulate or agglomerate. Examples of such treatments are disclosed in U.S. Pat. Nos. 4,052,353 and 4,171,296, which are incorporated herein by reference. The emulsion of the present invention may also be concentrated in any suitable manner, such as is disclosed in U.S. Pat. No. 4,021,399, which is also incorporated herein by reference.

The following methods can be used to qualitatively and quantitatively determine the degree of diallyl ammonium monomer incorporation into the final copolymer using the dried powder obtained from the emulsion or the self invertable emulsion.

(1) Solubility in Methanol

Copolymers of DADMAC and acrylamide having a DADMAC content greater than 30 mole % are soluble in ethanol. Copolymers in the range of 30 mole % are soluble in methanol, if, in addition, the methanol contains 10–20% water. Copolymers of low DADMAC content, as well as the homopolymer of acrylamide are totally insoluble in methanol or mixtures of 80% methanol and 20% water. The fact that the 50 mole % copolymer of Example 4 and the 30 mole % copolymer of Example 3 are soluble in methanol and a methanol-water mixture (80%/20%), respectively, demonstrates that no homopolyacrylamides or copolymers of low DADMAC content are present in these copolymers.

(2) Colloidal Titration Using Potassium Polyvinyl Sulfate

Using the method described by W. Schempp et al., *Papier*, 36 (10A), 41-6 (1982), the cationicity of the various copolymers produced can be determined. This procedure provides a method for determining the cationic charges bound to the particular polymer tested as expressed in eq/kg. Comparison with the theoretical calculated values, enables the calculation of the degree of diallyl ammonium monomer conversion.

The copolymers produced in accordance with this invention are used as aids in the dewatering of a wide variety of aqueous suspensions. These copolymers are particularly useful in the dewatering of organic sludge suspensions that are proteinaceous in nature or the dewatering of suspensions that have been obtained by the biological degradation of such matter. Such suspensions can be derived from raw or processed sewage, food waste, and fermentation effluents. The copolymers of this invention are also useful in the clarification of various types of industrial waste waters.

It is frequently desirable to dewater such sludges or suspensions in order to facilitate their removal and their disposal. Dewatering can be effected by the addition of an appropriate amount of the copolymer as a flocculating agent prior to the physical removal of water. Dewatering of sludges or suspensions is usually effected by the addition of an aqueous solution of the polymer having a concentration ranging from about 0.01 to about 1% by weight of polymer. Preferably from about 0.05% to about 0.5% of copolymer solution is employed. Typical addition rates for sewage sludge are in the range of about 0.2 to about 1.0% of polymer per total weight of sewage solids.

The copolymers of this invention are also useful in the paper industry as drainage and retention aids in the manufacture of paper, and in the dewatering of aqueous effluents containing cellulosic fibers. Such uses include, for example, treating aqueous waste water from a paper mill prior to discharge of the effluent, or treating return process water for the papermaking process. Such water may contain suspensions of cellulose or other finely divided particles in concentrations ranging from about 50 ppm to about 1 or 2% by weight of solution. The copolymers of this invention are particularly useful and are generally employed as solutions of about 0.01 to about 1%. However, it is sometimes more convenient to prepare stock solutions about 1 to about 2%, from which the copolymers can be utilized.

The invention described and claimed herein is more particularly illustrated in conjunction with the following examples, which are not intended to limit the invention in any way.

EXAMPLE 1

The aqueous phase and the oil phase to form the water-in-oil copolymer emulsion are prepared separately, mixed and emulsified by shear stirring. To prepare the aqueous phase 105.5 g of a 60% aqueous solution of DADMAC, 77 g of a 50% aqueous solution of acrylamide, 1.0 g of Versenex TM 80 chelant, a 40% aqueous solution of the pentasodium salt of diethylenetriaminepentaacetic acid, 0.25 g of 2,2'-azobis (N,N'-dimethylisobutyramidine) dihydrochloride, 1.00 g of sodium persulfate, 12.0 g of sorbitan monooleate and 120.8 g of water are dispersed with rapid mixing to form a hazy mixture, which is neutralized with a molar hydrochloric acid solution to a pH of 7. The oil phase is prepared by dissolving 6.0 g of oleic isopropanol amide in 255.0 g of Isopar M synthetic isoparaffin solvent.

The aqueous and the oil phase are mixed together with stirring and emulsified by mixing with a high speed stirrer at 10,000 to 20,000 rpm for 2 to 3 minutes.

The monomer emulsion is transferred to a glass reactor, equipped with a mixing shaft, heating jacket, vaccum control, reflux condenser and inlet ports for stage addition, stirred at about 200 rpm, and purged with nitrogen for 30 minutes to remove all oxygen. To start copolymerization the monomer emulsion is heated to a temperature of 35° C. and maintained at this temperature throughout the polymerization reaction.

As soon as an increase in temperature is observed, the remaining 424.3 g of a deoxygenated 50% aqueous solution of acrylamide is added to the copolymer emulsion over a period of one hour, via stage addition, with constant stirring. The feed rate is adjusted so that approximately 29% of the acrylamide solution is added during the first quarter of the total time period, 26% is added during the second quarter, 24% during the third quarter, and the remaining 21% of the acrylamide solution is added during the final quarter of the total stage-addition of one hour.

After completion of stage addition, the copolymer emulsion is maintained at 35° C. for an additional 30 minutes with stirring. A 10% aqueous solution of sodium hypophosphite, 15 g, is slowly added to the copolymer emulsion to form a copolymer mixture that is stirred for an additional 30 minutes at 35° C. The temperature of the copolymer emulsion mixture is raised to 75° C. and maintained at that temperature for 2 hours to reduce the amount of any residual monomer that may remain. The copolymer emulsion is cooled to room temperature and 40 g of a polyethoxylated aliphatic secondary alcohol having nine ethylene oxide units and a hydrophobic chain of 12-14 carbon atoms (sold by Deutsche BP Chemie GmbH as SOFTANOL TM 90 biological degradable surfactant) is added in small portions and mixed over a period of 90 minutes. The final emulsion is discharged and passed through a 149 micron screen to remove any coagulated gel particles that may have formed.

The finished copolymer prepared in this fashion has an intrinsic viscosity of 18.3 dl/g when measured in a 4% sodium chloride solution at 25° C. with a Brookfield LVT viscometer having a UL adapter. The cationicity, as determined by a potassium polyvinyl sulfate titration, shows an actual cationicity of 1.0 eq/kg, as compared to a theoretical cationicity of 1.25 eq/kg (79.8% DADMAC conversion). The copolymer is completely soluble in water and insoluble in methanol.

EXAMPLES 2 TO 4

Following essentially the same procedure as in Example 1, but making the following equivalent substitutions, uniform copolymers of DADMAC/acrylamide of varying cationicities were obtained. All weights are expressed in g.

| Example | 2 | 3 | 4 |
|---|---|---|---|
| Aqueous Phase | | | |
| Initial DADMAC charge (60% solution) | 158.0 | 276.3 | 422.4 |
| Initial Acrylamide charge (50% solution) | 68.3 | 57.0 | 39.4 |
| Water | 131.4 | 111.4 | 82.2 |
| Pentasodium salt of diethylenetriamine-pentacetic acid (40% solution) | 0.85 | 0.85 | 0.85 |
| 2,2'azobis(N,N'-dimethylene-isobutyramidine) dihydrochloride | 0.25 | 0.25 | 0.25 |
| Sodium persulfate | 1.0 | 1.0 | 1.0 |
| Sorbitan monooleate | 12.00 | 17.0 | 18.0 |
| Oil Phase | | | |
| Isopar M synthetic isoparaffin solvent | 255.0 | 255.0 | 255.0 |
| Oleic isopropanol amide | 6.0 | 1.0 | — |
| Stage addition | 2 | 3 | 4 |
| Acrylamide (50% solution) | 369.8 | 283.0 | 193.5 |
| Reaction Temp (°C.) | 35 | 35 | 35 |
| Stage Addition (hrs) | 2 | 3 | 4 |
| pH of reaction mixture | 7 | 7 | 7 |

The copolymers of DADMAC and acrylamide so obtained have the following properties:

| Example | 2 | 3 | 4 |
|---|---|---|---|
| Cationicity | 16 | 30 | 50 |
| Cationic Titration (eq/kg) | | | |
| Theoretical | 1.87 | 3.05 | 4.3 |
| Prior to Heating at 75° C. | 0.995 | — | 2.18 |
| Final Product | 1.53 | 2.28 | 3.56 |
| DADMAC Conversion (%) | | | |
| Prior to Heating at 75° C. | 53.2 | — | 50.8 |
| Final Product | 81.8 | 74.8 | 82.8 |
| *Emulsion Viscosity (mPa.s) | 20.9 | 16.0 | 13.7 |
| **Intrinsic Viscosity (dl/g) | 20.9 | 16.0 | 13.7 |
| Solubility Water | sol | sol | sol |
| Solubility Methanol | insol | ***insol | sol |

*Brookfield RVT Viscometer, Spindle 2, Speed 5 at 25° C.
**4% NaCl at 25° C.
***Sol 80% methanol/20% water

COMPARATIVE EXAMPLES 5 AND 6

Following essentially the same procedure described in Examples 2 and 4, but without stage addition of the acrylamide monomer, copolymers of DADMAC and acrylamide are obtained which have the following properties:

| Example | 5 | 6 |
|---|---|---|
| Cationicity (mole percent) | 16 | 50 |
| Cationic Titration (eq/kg) | | |
| Theoretical | 1.87 | 4.3 |
| Prior to Heating at 75° C. | 0.48 | 1.2 |
| Final Product | 1.36 | 3.43 |
| DADMAC %) | | |
| Prior to Heating at 75° C. | 25.7 | 29.8 |
| Final Product | 72.7 | 79.8 |
| *Intrinsic Viscosity (dl/g) | 20.1 | 13.2 |
| Solubility in water | sol | sol |
| Solubility in methanol | insol | insol |

*4% NaCl at 25° C.

The properties concerning DADMAC conversion shown in examples 5 and 6, in comparison to the results obtained in examples 2 and 4, clearly demonstrate the advantage of stage addition. Using the process of stage addition, the DADMAC conversion prior to burn out is approximately twice as high as that defined for the corresponding products prepared without stage addition. Moreover, even subsequent to burn out the DADMAC conversion is still higher by about 3 to 10%.

EXAMPLE 7 AND 8

Following essentially the same procedure described in Examples 2 and 4, but omitting the use of sodium hypophosphite as a chain transfer agent, crosslinked DADMAC and acrylamide copolymers are obtained which are only partly soluble in water, and which demonstrate a reduction in intrinsic viscosity.

| Example | 7 | 8 |
|---|---|---|
| Cationicity (mole percent) | 16 | 50 |
| Cationic Titration (eq/kg) | | |
| Theoretical | 1.87 | 4.3 |
| Actual | 1.13 | 3.21 |
| DADMAC conversion (%) | 60.6 | 74.7 |
| *Intrinsic Viscosity (dl/g) | 13 | 10.2 |
| Solubility in water | partly sol/ swells | partly sol/ swells |
| Solubility in methanol | insol | insol |

The results of the examples 7 and 8, pertaining to the actual cationicity and intrinsic viscosity, demonstrate that crosslinking took place, in contrast to corresponding examples 2 and 4 in which a chain transfer agent was added. In this case the measured cationicity is reduced, because insoluble polymer particles (gel particles) include cationic charges which can not be detected by the titration method used. Intrinsic viscosity is also reduced since a certain amount of polymer is bound by crosslinking, forming insoluble gel particles, which cannot contribute to the solution viscosity at low concentrations.

I claim:

1. A process for the preparation of an emulsion of a water-soluble, linear copolymer of a diallyl ammonium monomer and an acrylamide monomer having a uniform diallyl ammonium monomer to acrylamide monomer ratio comprising the steps of:
   a) preparing a water-in-oil monomer emulsion by mixing an oil phase containing an oil soluble emulsifying agent, with an aqueous phase comprising a mixture of diallyl ammonium monomer, a portion of the total amount of acrylamide monomer required, a polymerization initiator and a water dispersible emulsifying agent;
   b) initiating the copolymerization of said monomer emulsion by raising the temperature of the emulsion;
   c) adding the remaining acrylamide monomer to the monomer emulsion via continuous addition to form a homogeneous copolymer emulsion and maintaining the polymerization temperature during the addition;

d) homogeneously mixing a chain transfer agent into said copolymer emulsion to form a copolymer emulsion mixture after all of the remaining acrylamide monomer has been added and permitted to react; and e) raising the temperature of said copolymer emulsion mixture to from about 60° to 90° C., and maintaining at such temperature for from about 0.1 to about 4.0 hours.

2. A process according to claim 1 wherein the diallyl ammonium monomer corresponds to the formula:

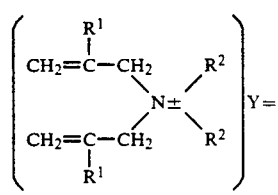

Formula I and the acrylamide monomer corresponds to the formula:

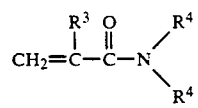

wherein $R^1$ is independently in each occurrence hydrogen or $C_{1-4}$ alkyl; $R^2$ independently in each occurrence hydrogen, a $C_{1-18}$ alkyl, $C_{1-18}$ alkoxyalkyl or $C_{1-18}$ hydroxyalkyl moiety; $R^3$ is independently in each occurrence hydrogen or a $C_{1-5}$ lower alkyl moiety; and $R^4$ is independently in each occurrence hydrogen, $C_{1-18}$ alkyl, $C_{1-18}$ alkoxyalkyl, or $C_{1-18}$ hydroxy alkyl; and Y is an anion.

3. A process as claimed in claim 2, wherein the oil phase comprises about 25 to about 30 volume % of the total emulsion composition.

4. A process as claimed in claim 3, wherein the copolymerization of step (b) is initiated by heating from about 30° to about 40° C.

5. A process as claimed in claim 4, wherein the addition of the said remaining acrylamide monomer in step (c) is over a period of about 0.5 to about 8 hours at a temperature of about 20° to about 50° C.

6. A process as claimed in claim 5, wherein the remaining acrylamide monomer is added in such a manner that a decreasing feed rate is achieved over the period of addition.

7. A process as claimed in claim 6, wherein about 15 to about 17% of the total amount of acrylamide monomer is added to step (a).

8. A process as claimed in claim 7, wherein from about 30 to about 35% of the acrylamide monomer is added during the first quarter of the said addition period, from about 25 to about 30% is added during the second quarter, from about 20 to about 25% is added during the third quarter and from about 15 to about 20% is added during the final quarter.

9. A process according to claim 8, wherein $R^1$ is hydrogen, methyl or ethyl; $R^2$ is hydrogen or $C_{1-18}$ alkyl; $R^3$ is hydrogen or methyl; $R^4$ is hydrogen or $C_{1-18}$ alkyl.

10. A process according to claim 9, wherein the oil phase emulsifying agent is oleic mono-isopropanol amide; the water phase emulsifying agent is sorbitan monooleate; the oil phase comprises a branched-chain isoparaffin solvent; and the chain transfer agent is sodium hypophosphite.

11. A process as claimed in claim 9, wherein the heating of step (e) is conducted at about 60° to about 90° C. for from about 0.1 to about 4.0 hours.

12. A process as claimed in claim 11, wherein a breaker surfactant is added to the heated copolymer emulsion mixture to obtain a self-inverting emulsion.

13. A process as claimed in claim 12, wherein the breaker surfactant is a polyethoxylate aliphatic secondary alcohol having nine ethylene oxide units and a hydrophobic chain of 12 to 14 carbon atoms.

14. A process as claimed in claim 12, wherein the diallyl ammonium monomer to acrylamide monomer ratio is from about 5 to about 95 mole percent.

15. A process as claimed in claim 14, wherein the diallyl ammonium to acrylamide monomer ratio is from about 25 to about 50 mole %.

* * * * *